US009194376B2

(12) United States Patent
Ritter et al.

(10) Patent No.: US 9,194,376 B2
(45) Date of Patent: Nov. 24, 2015

(54) SYSTEM AND METHOD FOR ESTIMATING REMAINING LIFE FOR A DEVICE

(75) Inventors: Allen Michael Ritter, Salem, VA (US); Robert Gregory Wagoner, Roanoke, VA (US); Robert Allen Seymour, Salem, VA (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 13/114,751

(22) Filed: May 24, 2011

(65) Prior Publication Data

US 2012/0029839 A1 Feb. 2, 2012

(51) Int. Cl.
G01B 3/44 (2006.01)
F03D 11/00 (2006.01)
G05B 23/02 (2006.01)

(52) U.S. Cl.
CPC ........ F03D 11/0091 (2013.01); G05B 23/0283 (2013.01); *Y02E 10/722* (2013.01)

(58) Field of Classification Search
CPC .................. F03D 11/0091; G05B 23/0283
USPC .................................... 702/34, 179–185, 130
See application file for complete search history.

(56) References Cited

U.S. PATENT DOCUMENTS

| 6,922,640 | B2* | 7/2005 | Vezzu et al. ..................... 702/34 |
| 7,395,188 | B1 | 7/2008 | Goebel et al. |
| 7,548,830 | B2 | 6/2009 | Goebel et al. |
| 7,826,985 | B2 | 11/2010 | Weiss et al. |
| 2004/0107067 | A1* | 6/2004 | Ishii et al. ...................... 702/136 |
| 2004/0260512 | A1* | 12/2004 | Olsson .......................... 702/182 |
| 2005/0005186 | A1* | 1/2005 | Goebel et al. ..................... 714/1 |
| 2005/0065749 | A1* | 3/2005 | Bernhardi et al. ............ 702/130 |
| 2005/0071090 | A1* | 3/2005 | Katou ............................ 702/34 |
| 2008/0140361 | A1 | 6/2008 | Bonissone et al. |
| 2008/0177516 | A1* | 7/2008 | Vasudevan et al. ............... 703/2 |
| 2009/0276165 | A1* | 11/2009 | Weiss et al. ..................... 702/34 |

FOREIGN PATENT DOCUMENTS

CN 101218401 A 7/2008

OTHER PUBLICATIONS

Chinese Office Action, dated Sep. 1, 2015, for co-pending CN patent application No. CN 201210179061, without an English-language translation. (9 pgs).

* cited by examiner

Primary Examiner — Janet Suglo
Assistant Examiner — Stephanie Bloss
(74) Attorney, Agent, or Firm — James McGinness, Esq.; Armstrong Teasdale LLP

(57) ABSTRACT

A system and method for estimating a remaining life period for a device. The system includes a sensor coupled to the device, wherein the sensor is configured to facilitate measuring an operating parameter of the device and generate a measurement signal that is representative of the operating parameter. The system includes a database comprising an upper limit value, a lower limit value and a reference parameter. A processor of system includes circuitry coupled to the sensor and coupled to the database The processor is configured to correlate measurements of the operating parameter with the reference parameter to facilitate estimating a remaining life period of the device.

11 Claims, 6 Drawing Sheets

SYSTEM AND METHOD FOR ESTIMATING REMAINING LIFE FOR A DEVICE

BACKGROUND OF THE INVENTION

The present disclosure relates to prognostics for a device, and in particular, a system and method for estimating remaining life for the device.

Estimating a remaining life of equipment is known as prognostics. Remaining life estimates provide valuable information for operation of equipment. Remaining life estimates provide decision making aids that allow operators to change operational characteristics (such as load), which in turn may prolong the life of the equipment. Remaining life estimates also allow planners to account for upcoming maintenance and set in motion a logistics process that supports a smooth transition from faulted to fully functioning equipment. Predicting remaining life is not straightforward because, ordinarily, remaining life is dependent upon future usage parameters, such as load and speed. In addition, an understanding of the underlying physics that govern remaining life is hard to ascertain for complex equipment where numerous fault modes can potentially be the driver for remaining life.

A common approach to prognostics is to employ a model of damage propagation contingent on future use. Such a model is often based on detailed materials knowledge and makes use of finite element modeling. Because such models are extremely costly to develop, they are limited to a few important parts of a subsystem, but are rarely applied to a full system.

Another known approach for estimating remaining life is a data-driven approach where equipment behavior is tracked via sensor measurements during normal operation throughout the useful life of the equipment. The end of equipment useful life can represent a totally non-functioning state of the equipment for example, equipment failure. The end of equipment useful life can also represent a state of the equipment wherein the equipment no longer provides expected results. Pattern recognition algorithms can be employed to recognize trends and predict remaining life. This approach provides voluminous amounts of data resulting in expensive algorithms to process the data. Further, these predictions are often made under an assumption of near-constant future load parameters.

Known power equipment rarely operates under near-constant load parameters. Wind turbines, for example, demand cost-effective solutions capable of operating under severe & variable conditions. Product end-of-life and unscheduled downtime may vary significantly from turbine to turbine, complicating design predictions and fleet maintenance. The exposure to cyclic stress varies dramatically from turbine to turbine, and provision of margin for the most demanding turbine results in excessive cost to the majority. Further expectations of known cyclic fatigue typically are based on manufacturer's predefined cycles to failure, wherein known turbine operation rarely repeats those manufacturers' predefined cycles.

BRIEF DESCRIPTION OF THE INVENTION

In one aspect, a system is provided for estimating a remaining life period for a device. The system includes a sensor coupled to the device, wherein the sensor is configured to facilitate measuring an operating parameter of the device and generate a measurement signal that is representative of the operating parameter. The system includes a database comprising an upper limit value, a lower limit value and a reference parameter. The system includes a processor having circuitry coupled to the sensor and coupled to the database, wherein the processor is configured to facilitate correlation of measurements of the operating parameter with the reference parameter to facilitate estimating a remaining life period of the device.

In another aspect, a method of estimating a remaining life of a device includes establishing an operating parameter to be measured for the device. An upper limit value and a lower limit value for the operating parameter are then established, wherein the upper limit value and the lower limit value define a range of elastic strain of the device. The method also includes establishing a reference parameter between the upper limit value and the lower limit value. The operating parameter of the device is measured during an operational cycle of the device. The method includes correlating measurements of the operating parameter with the reference parameter to facilitate estimating a remaining life period of the device.

In a further aspect, a method of estimating a remaining life of a power device includes establishing a temperature parameter to be measured for the device. An upper temperature value and a lower temperature value for the temperature parameter are then established, wherein the upper temperature value and the lower temperature value define a range of elastic strain of the power device. The method also includes establishing a reference temperature between the upper temperature value and the lower temperature value. The temperature parameter is measured during an operational cycle of the power device. The method includes correlating measurements of the operating temperature with the reference temperature to facilitate estimating a remaining life period of the power device.

DETAILED DESCRIPTION OF THE INVENTION

Figure 1:
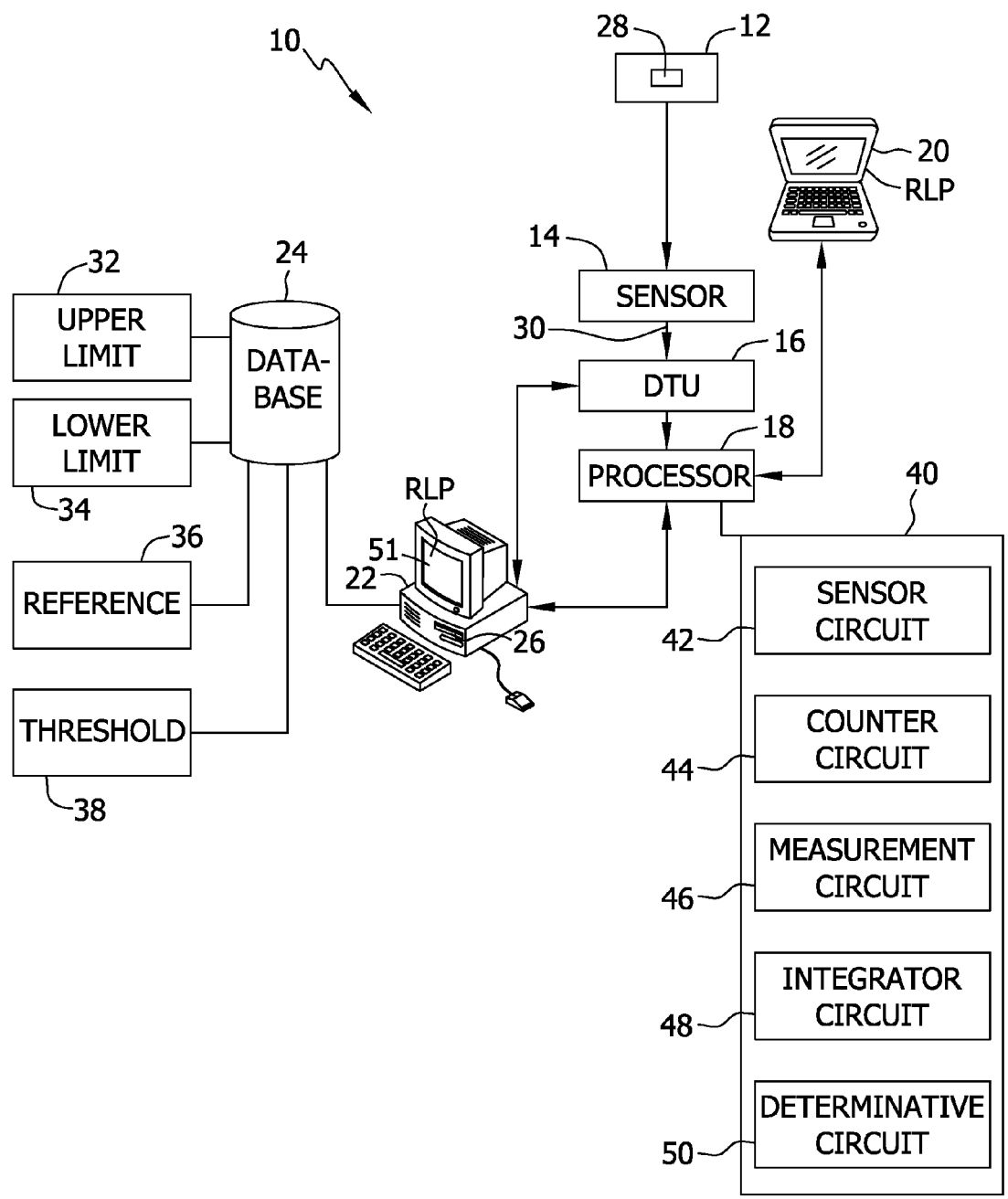
FIG. 1 is a schematic diagram of an exemplary embodiment of a system for calculating a remaining life period of a device.

FIG. 1 is a schematic diagram of an exemplary embodiment of a system 10 configured to facilitate a prognostic analysis for estimating a remaining life period RLP for a device 12 of system 10. Remaining life estimates are in units of time or cycles. A life estimate typically has associated uncertainty that is described as a probability density curve around an actual estimate. Diagnostics include a detection of a fault parameter, or an observed change in an operational state of device 12 that is related to a verifiable event. In this embodiment, a fault is determined to be a sign of a potential end of equipment useful life at some future time. An example of such a fault is an increase in thermal cycling of device 12, which may result in unscheduled maintenance and possibly operational disruption.

System 10 includes device 12, at least one sensor 14, a data transfer unit 16, a processor 18, an interface unit 20, a computer 22, and a database 24. Computer 22 further includes a program storage device 26. System 10 includes any equipment having a measurable parameter that facilitates estimating remaining life period of device 12.

Sensor 14 is coupled to device 12 and is configured to be responsive to at least one operating parameter 28 of device 12. Operating parameter 28 includes parameters such as, but not limited to, speed, load, energy consumption and temperature. Operating parameter 28 includes any operating characteristic of device 12 that can be measured to predict remaining life of device 12. In particular, sensor 14 is configured to facilitate sensing operating parameter 28 and to generate a measurement signal 30 representative of operating parameter 28 of device 12. Sensor 14 transmits signal 30 to processor 18.

In an embodiment, processor 18 is coupled with interface device 20. Processor 18 is also coupled with computer 22, wherein computer 22 is coupled with database 24. Computer 22 is configured to make available to database 24, via processor 18, historical data and/or modeled data and/or current data relating to device 12. In an embodiment, database 24 is further configured to store and make available to computer 22 data relating to operating parameters 28 of device 12, including signals 30 generated by sensor 14.

Database 24 includes information that facilitates estimating remaining life of device 12. Information of database 24 includes an upper limit value 32, a lower limit value 34 and a reference parameter 36. Upper limit value 32 and lower limit value 34 include values that define a range of elastic strain for device 12. Values beyond upper limit value 32 and lower limit value 34 define plastic strain for device 12. Reference parameter 36 is a value between upper limit value 32 and lower limit value 34. As set forth below, processor 18 facilitates correlating measurements of operating parameter 28 to reference parameter 36 based on a status of operating parameter 28 as compared to upper limit value 32 and lower limit value 34. Database 24 further includes a predetermined threshold value 38. As set forth below, threshold value 38 facilitates estimating remaining life period RLP of device 12. Upper limit value 32, lower limit value 34, reference parameter 36 and threshold value 38 are initially established and input into database 24 based on compilation of historical data and/or modeled data and/or current device data relating to device 12.

Processor 18 includes circuitry 40 coupled to sensor 14 and to database 24 to facilitate computational calculations for estimating remaining life of device 12. Circuitry 40 is configured to receive measurement signal 30 of operating parameter 28 of device 12. Processor 18 is configured to facilitate correlation of measurements of operating parameter 28 with reference parameter 36 to facilitate estimating remaining life period RLP of device 12. Circuitry 40 includes sensor circuitry 42, counter circuitry 44, measurement circuitry 46, integrator circuitry 48 and determinative circuitry 50.

Sensor circuitry 42 is configured to receive measurement signal 30 from sensor 14 that is representative of operating parameter 28. Counter circuitry 44 is configured to count when operating parameter 28 exceeds upper limit value 32 and/or lower limit value 34 of database 24 during an operational cycle of device 12. Measurement circuitry 46 is configured to measure a plurality of changes in value of reference parameter 36 generated in response to operating parameter 28 exceeding upper limit value 32 and/or a lower limit value 34 during the operational cycle of device 12. Integrator circuitry 46 is configured to calculate integrals of absolute values of the plurality of changes in value of reference parameter 36 during the operational cycle to produce an integrated value of the plurality of value changes of reference parameter 36.

Determinative circuitry 50 is configured to facilitate estimating the remaining life period RLP for device 12 when the integrated value achieves the predetermined threshold value 38. Predetermined threshold value 38 correlates fatigue of device 12 associated with operating parameter 28 exceeding elastic limits defined by upper limit value 32 and lower limit value 34. Processor 18 generates a reduced-order metric of the expected remaining life period RLP of device 12 and utilizes the number of cycles and/or depth of penetration beyond elastic limits by device 12 to generate low-order signals indicative of consumed life of device 12.

Determinative circuitry 50 aggregates data from sensor 14 while accounting for inherent uncertainties of sensor 14. The uncertainty may vary as a function of time, reliability of sensor 14, and domain knowledge, among others. Determinative circuitry 50 checks sensor signals 30 for consistency and filters signals to remove outliers, noise and faults or otherwise poor sensor information.

For diagnostic purposes, determinative circuitry 50 is also configured to initiate a signal 51 indicating remaining life period RLP. In an embodiment, signal 51 includes a visual signal such as a warning light or readout display illustrating the remaining life period RLP. In another embodiment, signal 51 includes an audible signal such as a warning sound to indicate remaining life period RLP.

While an embodiment has been described having a computer 22 in signal communication with processor 18, computer 22 can also be in direct communication with data transfer unit 16. It will be further appreciated that an embodiment of the invention also includes computer 22 in communication with the data transfer unit 16 through a variety of communication protocols, such as cellular, wireless Internet, and others, for example, to allow a connection between computer 22 and data transfer unit 16.

The term "computer", as used herein, includes desktop and laptop type computes, servers, microprocessor based systems, application specific integrated circuits, and any programmable integrated circuit capable of performing the functions described herein in connection with system 10.

Figure 2:
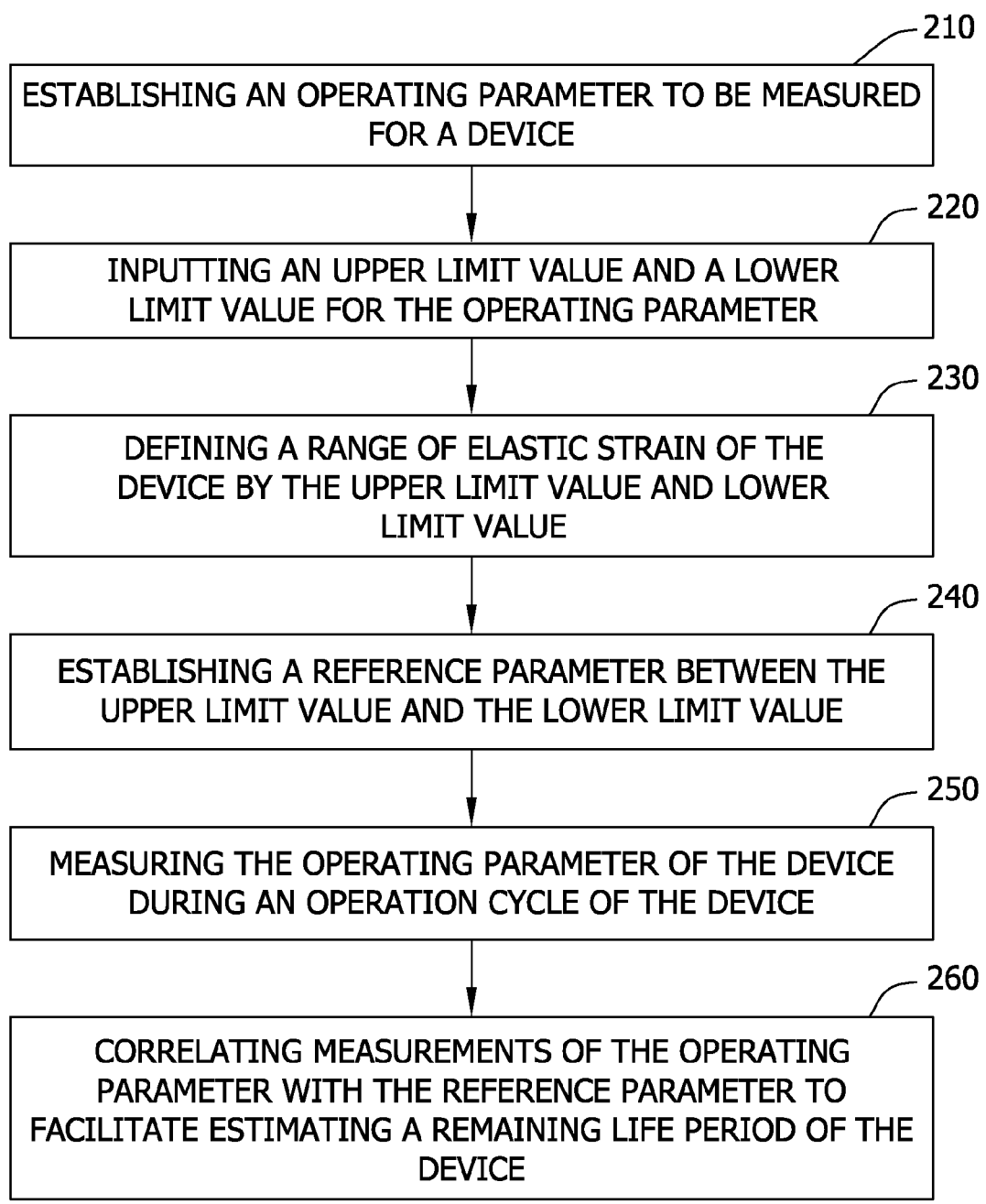
FIG. 2 is a flowchart of an exemplary method for use in calculating the remaining life period for the device of FIG. 1.

FIG. 2 illustrates a flowchart of a method of predicting remaining life period RLP for device 12. Prior to operation of device 12, operating parameter 28 to be measured is established 210 within processor 18. Once operating parameter 28 is established, upper limit value 32 and lower limit value 34 are inputted 220 into processor 18. Upper limit value 32 and lower limit value 34 relate to operating parameter 28 through historical data and/or modeled data. For example, when operating parameter 28 is established as temperature, upper limit value 32 corresponds to a maximum temperature and lower limit value 34 corresponds to a minimum temperature, such that upper limit value 32 and lower limit value 34 define a range of elastic strain 230 for device 12. When device 12 operates within a range of elastic strain defined by upper limit value 32 and lower limit value 34, device 12 experiences elastic strain. When device 12 operates beyond upper limit value 32 and/or lower limit value 34, device 12 experiences plastic strain.

After operating parameter 28 is established, reference parameter 36 is also inputted 240 into processor 18. Reference parameter 36 includes a value between upper limit value 32 and lower limit value 34 such that upper limit value 32 and lower limit value 34 define settings for reference parameter 36. As an example, when operating parameter 28 is established as temperature, reference parameter 36 corresponds to modeled operating temperature. Known modeling schemes correlate actual operating parameter 28 with modeled reference parameter 36.

During an operational cycle of device 12, sensor 14 measures 250 operating parameter 28. During operation, operating parameter 28 fluctuates within a range defined by upper limit value 32 and lower limit value 34. While operating parameter 28 fluctuates within the range defined by upper limit value 32 and lower limit value 34, any strain experienced by device 12 includes allowable elastic strain for device 12.

When operating parameter 28 exceeds upper limit value 32 and/or lower limit value 34, reference parameter 36, based on modeling techniques, adjusts in value to facilitate keeping the settings of upper limit value 32 and lower limit value 34 surrounding operating parameter 28. Values of the reference parameter 36 change in response to operating parameter 28 exceeding upper limit value 32 and/or lower limit value 34. When operating parameter 28 exceeds upper limit value 32 and/or lower limit value 34, any strain experienced by device 12 includes plastic strain.

Processor 18 measures and records a plurality of changes in values of reference parameter 36 generated in response to operating parameter 28 exceeding the upper limit value 32 and/or the lower limit value 34. Processor 18 then calculates integrals of absolute values of the change in values of reference parameter 36 during the operational cycle. Processor 18 integrates the values of the plurality of changes in value of reference parameter 36 to calculate an integrated value of the plurality of changes in values of reference parameter 36. Processor 18 then estimates a remaining life period RLP 260 for the device 12 when the integrated value achieves predetermined threshold value 38.

Processor 18 maintains a record of changes in value of reference parameter 36 represented by the value of the accumulated integral of the absolute value of all changes to reference parameter 36 during operating life of device 12. Based on historical data and/or modeled data, achieving predetermined threshold value 38 indicates a consumption of life for device 12. Determinative circuitry 50 generates signal 51 to alert operator or system 10 of remaining life period RLP.

Figure 3:
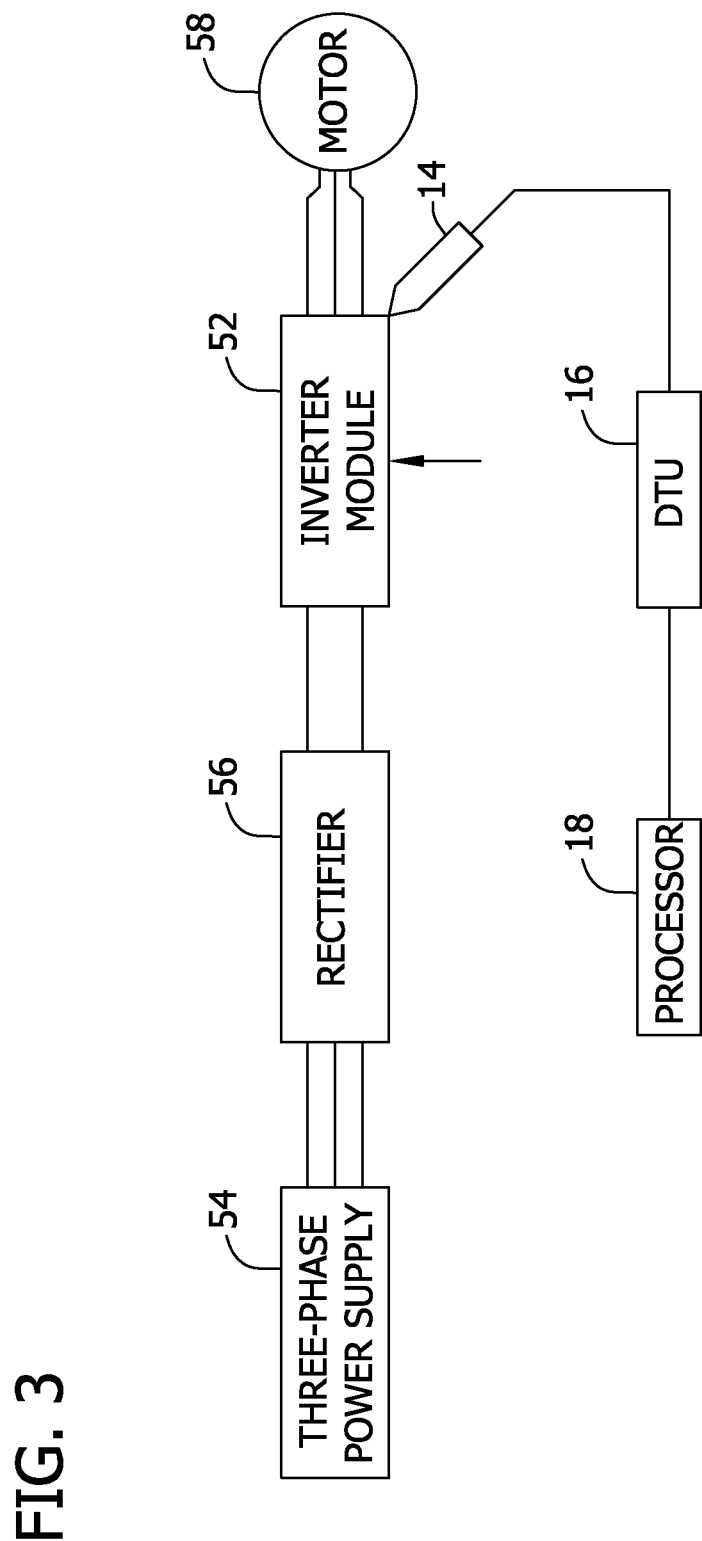
FIG. 3 is a schematic diagram of an exemplary embodiment of a system for calculating a remaining life period of a power device.

FIG. 3 illustrates system 10 having an exemplary device 12 coupled with processor 18 having remaining life prediction circuitry 40, wherein device 12 includes a power module 52. Power module 52 generates a desired power waveform to power various devices, such as motors and other equipment (not shown). Power module 52 generally includes power semiconductor switches such as insulated gate bipolar transistors (IGBTs) that are caused to cycle rapidly on and off to produce a desired power waveform.

System 10 includes power supply 54 that provides a three-phase voltage waveform at a constant frequency to a rectifier 56. Rectifier 56 performs full wave rectification of the three phase voltage waveform, outputting a direct current voltage difference to power module 52. Module 52 accepts the positive and negative lines of DC voltage from the rectifier 56 circuitry and outputs a three phase waveform at a desired frequency, independent of the frequency of three-phase power supply 54. Processor 18 provides power module 52 with appropriate signals, enabling power module 52 to output the waveform. The resulting three-phase waveform may thereafter drive a load, such as a motor 58.

A predominant cause of failure for power module 52 arises from power cycling, which causes connections to fatigue and fail. Moreover, thermal cycling of the type employed by IGBT's may initiate wire crack growth at wire wedge bonds and similar contact points, generally occurring at connections on the IGBTs. Strain and fatigue introduced by a mismatch of the coefficient of thermal expansion of module materials tends to cause wire crack growth. Further, new cracks are caused by thermal cycling, leading to strain and fatigue of power module 52.

Power modules 52 tend to fail in a predictable manner under constant operating parameters, such as constant maximum junction temperature and median junction temperatures. As a result, manufacturers of power modules 52 provide cycle life rating data at particular operating parameters. For example, a manufacturer provides various cycle life rating data at certain upper junction temperatures ($T_{jUpper}$), lower junction temperature ($T_{jLower}$), junction temperature change ($\Delta T_j$), and mean junction temperatures ($T_m$). The mean junction temperature may be defined as the junction temperature averaged over time or averaged based upon the upper and lower junction temperature. While power module life cycle data may offer predictability under constant operating parameters, many power module applications, such as an IGBT, tend to operate under variable parameters.

In the exemplary embodiment, with measurement data from sensor 14, processor 18 tracks various parameters under which power module 52 may be operating. Sensor data further allows processor 18 to predict when power module 52 may likely fail due to thermal cycling, allowing operators to prepare with preventive maintenance or appropriate planning. Processor 18 determines operating parameters 28 such as maximum junction temperature ($T_{upper}$), minimum junction temperature ($T_{lower}$), junction temperature change ($\Delta T_j$), and mean junction temperature ($T_m$). For example, thermal regulator software running on processor 18 calculates maximum junction temperature ($T_{upper}$) and/or minimum junction temperature ($T_{lower}$) using known methods based on a thermal network model. Junction temperature change ($\Delta T_j$) may likewise be determined using known methods based on temperature feedback data from sensors 14 and/or estimated heat dissipation based on output current.

Figure 4:
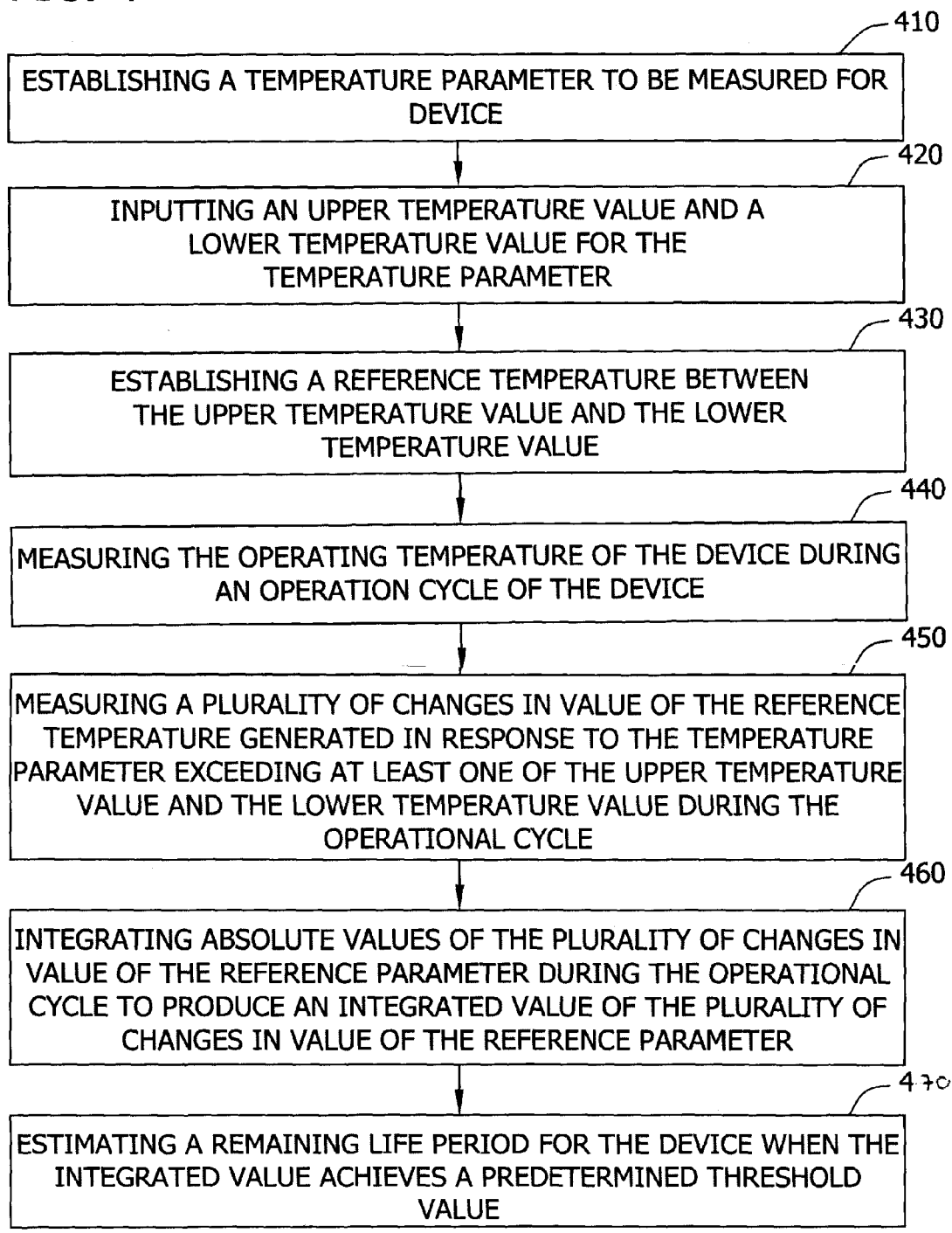
FIG. 4 is a flowchart of an exemplary method for use in calculating the remaining life period for the power device of FIG. 3.

FIG. 4 illustrates a flowchart of a method of predicting a remaining life period for power model device 12, wherein the operating parameter includes the operating temperature of device 12. Prior to operation of power device 12, temperature parameters 59 are established 410 within processor 18. Once temperature parameter 59 is established, upper temperature value 60 and lower temperature value 62 are inputted 420 into processor 18. Upper temperature value 60 and lower temperature value 62 define a range of elastic strain for power device 12. When power device 12 operates within a range defined upper temperature value 60 and lower temperature value 62, power device 12 experiences elastic strain. When power device 12 operates beyond upper temperature value 60 and/or lower temperature value 62, power device 12 experiences plastic strain.

After the temperature parameters are established, reference temperature 64 is also inputted 430 into processor 18. Reference temperature 64 includes a value between upper temperature value 60 and lower temperature value 62 such that upper temperature value 60 and lower temperature value 62 define limits for reference temperature 64. Reference temperature 64 corresponds to modeled operating temperature for module 52. In the exemplary embodiment, reference temperature 64 is initially set at a midpoint between upper temperature value 60 and lower temperature value 62. Known modeling schemes correlate modeled reference temperature 64 with actual temperature parameter 59. Reference temperature 64 can be initially set at any acceptable modeled temperature.

Figure 5:
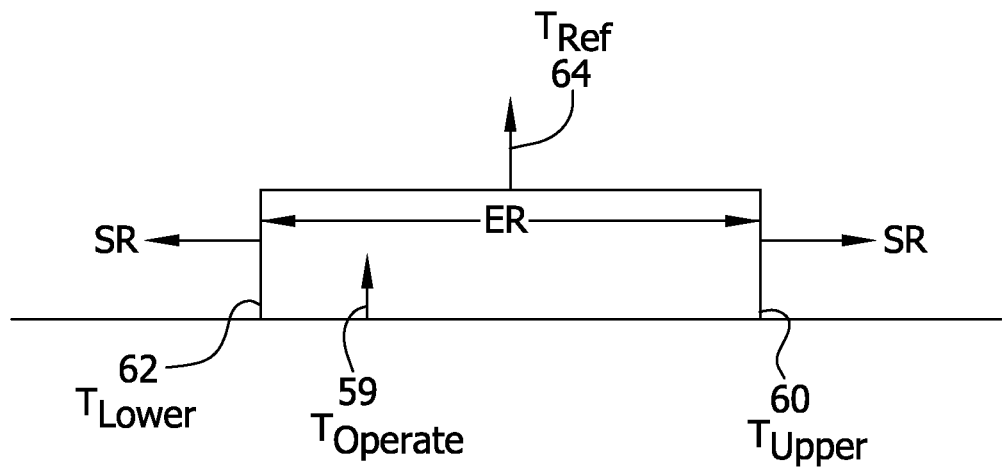
FIG. 5 is a block diagram illustrating a temperature parameter and a reference temperature parameter bounded by an upper temperature value and a lower temperature value.

FIG. 5 is a block diagram illustrating temperature parameter 28 within elastic range, generally shown as "ER", as defined by upper temperature value 60 and lower temperature value 62. During an operational cycle of power device 12, sensor 14 measures 440 temperature parameter 59. During operation, temperature parameter 59 fluctuates within the range defined by upper temperature value 60 and lower temperature value 62. While temperature parameter 28 fluctuates within a range defined by upper temperature value 60 and lower temperature value 62, any strain experienced by power device 12 includes allowable elastic strain for power device 12.

Figure 6:
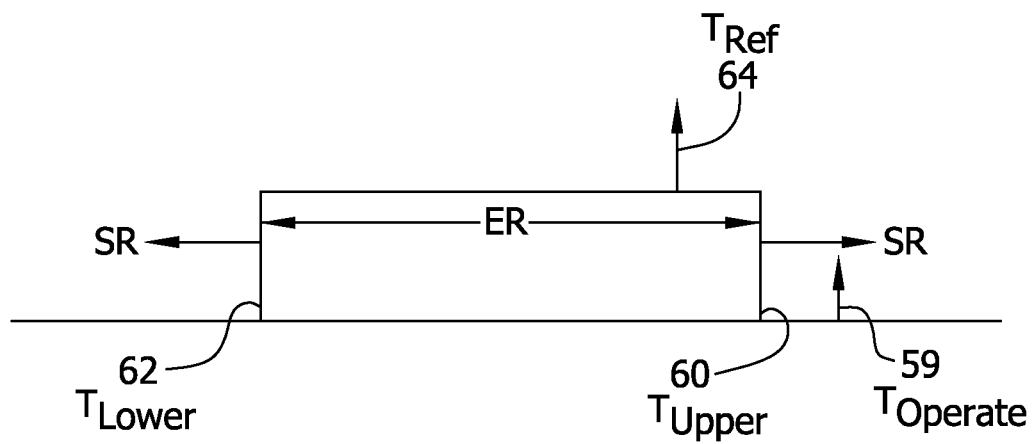
FIG. 6 is another block diagram of the temperature parameter of FIG. 5 exceeding the upper temperature value and a position of the reference temperature adjusted in response to the temperature parameter exceeding the upper temperature value.

FIG. 6 is another block diagram illustrating temperature parameter exceeding upper temperature value 60 and reference temperature 64 readjusting in response to temperature parameter exceeding upper temperature value 60. When the temperature parameter exceeds upper temperature value 60 and/or lower temperature value 62, reference temperature 64, based on modeling techniques, changes to facilitate modeling the settings of upper temperature value 60 and lower temperature value 62 around temperature parameter 59. Values beyond upper temperature value 60 and lower temperature value 62 define a range of plastic strain, generally shown as "SR", for module 52. When the temperature parameter exceeds upper temperature value 60 and/or lower temperature value 62, any strain experienced by power device 12 includes plastic strain.

Values of reference temperature 64 change in response to temperature parameter 59 exceeding upper temperature value 60 and/or lower temperature value 62. Processor 18 measures and records a plurality of changes in values 450 of reference temperature 64 generated in response to temperature parameter 59 exceeding upper temperature value 60 and/or lower temperature value 62. Processor 18 then calculates integrals of absolute values of the change in values 460 of reference temperature 64 during operational cycle. Processor 18 integrates the values of the plurality of changes in value of reference temperature 64 to calculate an integrated value of the plurality of changes in values of reference temperature 64. Processor 18 then estimates 470 remaining life period RLP for the power device 12 when the integrated value achieves the predetermined threshold value 38.

Figure 7:
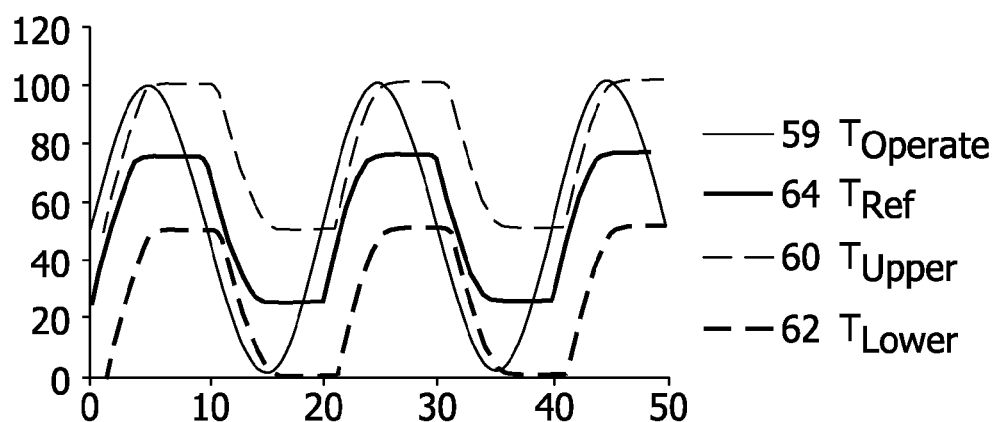
FIG. 7 is a graph illustrating a relationship between the temperature parameter, an upper temperature value, a lower temperature value and the reference temperature of FIGS. 5 and 6.

FIG. 7 is a graph illustrating temperature parameter 59 fluctuating over time with respect to upper temperature value 60 and lower temperature value 62. FIG. 7 also illustrates reference temperature 64 adjusting as temperature parameter 59 fluctuates over time into the plastic strain range. As shown, when temperature parameter 59 fluctuates within upper temperature value 60 and lower temperature value 62, reference temperature 64 remains the same value over time. When temperature parameter 59 exceeds upper temperature value 60 and/or lower temperature value 62, reference temperature 64 changes in value over time. For example, when temperature parameter 59 exceeds upper temperature value 62, reference temperature 64 increases; and, when temperature parameter 59 exceeds beyond lower temperature value 62, reference temperature 64 decreases.

Figure 8:
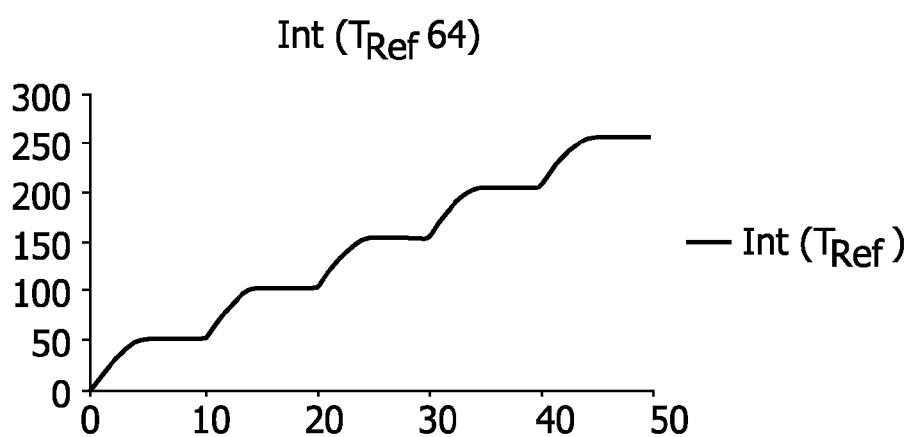
FIG. 8 is a graph illustrating the reference temperature changing over time as represented in FIG. 7.

FIG. 8 is a graph illustrating changes of reference temperature 64 as graphically displayed in FIG. 7. FIG. 8 illustrates that for a small deviation in temperature parameter 59 to a previous temperature value within the limits of upper temperature value 60 and lower temperature value 62, no additional fatigue is accumulated as represented by constant reference temperature 59. When temperature parameter 59 exceeds upper temperature value 60 and/or lower temperature value 62, accumulation of fatigue continues since device 12 experiences plastic deformation beyond upper temperature value 60 and/or lower temperature value 62.

In the exemplary embodiment, processor 18 records changes in the positions of reference temperature 64, and the consumption of life of device 12 is represented by the value of the accumulated integral of the absolute value of all changes to the reference temperature 64 within the elastic temperature range ER during the life of device 12. Expected end-of-life is represented by the value of the integrator achieving predetermined threshold value 38.

The system and method described herein improves calculating remaining life periods for devices based on actual operation of the device. The system uses non-linearities in the remaining life calculation to provide significant online data reduction yielding reduced order signals. The system recognizes fatigue associated with excursions beyond elastic limits of devices to produce a reduced order signal of the expected life of the device. The system predicts remaining useful life of equipment absent a run to failure data; the ability to express overall device health as a function of various operation attributes; the ability to map system observables to device health; the ability to estimate equipment deterioration; the ability to extrapolate remaining life estimates for virtual run-to-failure; and the ability to provide remaining life estimates during on-line equipment life assessment.

Fidelity of the system may be enhanced by the insertion of additional transfer function such as, but not limited to, power functions, logarithms, and filters. The system also is capable of quantifying different sources of uncertainty such as, but not limited to, device uncertainty, fault modeling uncertainty, sensor noise, variations in time of fault identification, variations in duration of fault parameter, variations in fault propagation assumptions, and variations in transfer function parameters.

A technical effect of the system described herein includes measuring the operating parameter of the device during an operation cycle of the device and, correlating measurements of the operating parameter with the reference parameter to facilitate estimating a remaining life period of the device.

Exemplary embodiments of the system, device, and methods of calculating remaining life periods are described above in detail. The system, device, and methods are not limited to the specific embodiments described herein, but rather, components of the system and/or device and/or steps of the method may be utilized independently and separately from other components and/or steps described herein. For example, the cooling device and methods may also be used in combination with other electrical devices and methods, and are not limited to practice with only the electrical device as described herein.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, wherein, when computer program code is loaded into and executed by a computer, computer becomes an apparatus for practicing the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when computer program code is loaded into and executed by a computer, computer becomes an apparatus for practicing the invention. When implemented on a general-purpose microprocessor, computer program code segments configure the microprocessor to create specific logic circuits. A technical effect of the executable instructions is to predict a remaining useful life of equipment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for estimating remaining life for a device, the method comprising:
   establishing an operating temperature parameter to be measured for the device;
   inputting an upper temperature limit value and a lower temperature limit value for the operating temperature parameter, the upper temperature limit value and the lower temperature limit value defining a range of elastic strain of the device;
   establishing a reference temperature parameter between the upper temperature limit value and the lower temperature limit value;
   measuring the operating temperature parameter of the device through a temperature sensor during an operation cycle of the device;
   correlating measurements of the operating temperature parameter with the reference temperature parameter based on a status of the operating temperature parameter as compared to at least one of the upper temperature limit value and the lower temperature limit value during an operational cycle of the device;
   measuring a plurality of changes in value of the reference temperature parameter generated in response to the operating temperature parameter exceeding at least one of the upper temperature limit value and the lower temperature limit value during the operational cycle;
   determining adjustment values to the reference temperature parameter when the operating temperature parameter exceeds at least one of the upper temperature limit value and the lower temperature limit value;
   adjusting a value of the reference temperature parameter to maintain the reference temperature parameter within a range defined by the upper temperature limit value and the lower temperature limit value to facilitate estimating a remaining life period of the device;
   recording the plurality of changes in value of the reference temperature parameter;
   calculating an integrated value of the plurality of changes in value of the reference temperature parameter;
   estimating the remaining life period for the device when the integrated value achieves a predetermined threshold value; and,
   directing an operator to initiate a logistics process to modify a maintenance plan for the device based on the estimated remaining life period.

2. The method of claim 1, wherein recording the plurality of changes in value of the reference temperature parameter comprises calculating integrals of absolute values of the plurality of changes in value of the reference temperature parameter during the operational cycle to calculate the integrated value of the plurality of changes in value of the reference temperature parameter.

3. The method of claim 1, wherein the reference temperature parameter comprises a midpoint temperature as measured between the upper temperature limit value and the lower temperature limit value.

4. The method of claim 3, wherein the device comprises an insulated gate bipolar transistor.

5. The method of claim 4, wherein the operating temperature parameter comprises a junction temperature of the insulated gate bipolar transistor.

6. A method for estimating remaining life for a power module device, comprising:
   establishing a temperature parameter to be measured for the power module device;
   inputting an upper temperature value and a lower temperature value for the temperature parameter, the upper temperature value and the lower temperature value defining a range of elastic strain of the power module device;
   establishing a reference temperature between the upper temperature value and the lower temperature value;
   measuring the operating temperature of the device through a temperature sensor during an operation cycle of the power module device;
   determining adjustment values to the reference temperature when the operating parameter exceeds at least one of the upper temperature value and the lower temperature value comprising measuring a plurality of changes in value of the reference temperature generated in response to the temperature parameter exceeding at least one of the upper temperature value and the lower temperature value during the operational cycle;
   adjusting a value of the reference temperature to maintain the reference temperature within a range defined by the upper temperature value and the lower temperature value;
   calculating integrals of absolute values of the plurality of changes in value of the reference temperature during the operational cycle to produce an integrated value of the plurality of changes in value of the reference parameter;
   estimating a remaining life period of the power module device when the integrated value achieves a predetermined threshold value which defines a strain value of the power module device; and
   directing an operator to initiate a logistics process to modify a maintenance plan for the power module device based on the estimated remaining life period.

7. A system for estimating life of a device, said system comprising:
   a temperature sensor coupled to said device, said temperature sensor configured to facilitate measuring an operating temperature parameter of said device and generate a temperature measurement signal that is representative of the operating temperature parameter;
   a database comprising an upper temperature limit value, a lower temperature limit value and a reference temperature parameter, the upper temperature limit value and the lower temperature limit value defining a range of elastic strain of the device; and, a processor coupled to said temperature sensor and coupled to said database, said processor configured to:
  adjust a value of the reference temperature parameter to maintain the reference temperature parameter within a range defined by the upper temperature limit value and the lower temperature limit value;
  calculate integrals of absolute values of changes in value of the reference temperature parameter in response to the operating temperature parameter exceeding at least one of the upper temperature limit value and the lower temperature limit value during said operational cycle to produce an integrated value of the changes in value of said reference temperature parameter;
  estimate a remaining life period for the device when the integrated value achieves a predetermined threshold value which defines a strain value of the device; and
  direct an operator to initiate a logistics process to modify a maintenance plan for the device based on the estimated remaining life period.

8. The system of claim 7, wherein said processor comprises sensor circuitry configured to receive said temperature measurement of said operating temperature parameter.

9. The system of claim 7, wherein said processor comprises measurement circuitry configured to measure said plurality of changes in value of said reference temperature parameter in response to said operating temperature parameter exceeding at least one of said upper temperature limit value and said lower temperature limit value.

10. The system of claim 9, wherein said processor comprises counter circuitry configured to count said changes in value of said reference temperature parameter.

11. The system of claim 7, wherein said upper temperature limit value and the lower temperature limit value define a range of temperatures that correspond to a range of elastic strain of said device.

* * * * *